United States Patent [19]
Devaud

[11] 3,936,949
[45] Feb. 10, 1976

[54] STATIC NON-SWINGING COURSE DETERMINING DEVICE ON A VEHICLE

[75] Inventor: Jacques Devaud, Chabeuil, France

[73] Assignee: Grouzet, Paris, France

[22] Filed: Dec. 27, 1973

[21] Appl. No.: 428,774

[30] Foreign Application Priority Data
Jan. 2, 1973 France .............................. 73.00084

[52] U.S. Cl. ...................... 33/352; 33/354; 33/361; 324/47
[51] Int. Cl.² .................. G01C 21/08; G01C 17/30
[58] Field of Search ............ 33/349, 351, 352, 354, 33/356, 361; 324/43 R, 47

[56] References Cited
UNITED STATES PATENTS

| | | | |
|---|---|---|---|
| 2,204,292 | 6/1940 | Barth | 33/204 |
| 2,464,057 | 3/1949 | Phair | 33/356 |
| 2,597,125 | 5/1952 | Noxon | 33/361 |
| 2,597,135 | 5/1952 | Stuart | 33/361 |
| 2,671,275 | 3/1954 | Burns | 33/361 |
| 3,133,244 | 5/1964 | Wojtulewicz | 33/356 |
| 3,135,199 | 6/1964 | Brown | 324/43 R |
| 3,584,388 | 6/1971 | Petrov et al. | 33/349 |
| 3,628,254 | 12/1971 | Burmeister | 33/225 |
| 3,678,593 | 7/1972 | Baker et al. | 33/361 |
| 3,696,518 | 10/1972 | Leat | 33/357 |

FOREIGN PATENTS OR APPLICATIONS

| | | | |
|---|---|---|---|
| 591,019 | 8/1947 | United Kingdom | 33/356 |
| 1,313,414 | 11/1962 | France | |
| 2,083,282 | 11/1971 | France | |

Primary Examiner—Richard E. Aegerter
Assistant Examiner—Richard R. Stearns
Attorney, Agent, or Firm—Stevens, Davis, Miller & Mosher

[57] ABSTRACT

A static non-swinging device for determining the course on board a vehicle comprising a magnetometer having three axes for determining the components of the earth's magnetic field along three axes connected to the vehicle, a vertical gyroscope and a computer for calculating the direction with respect to the vehicle of the horizontal component of the earth's magnetic field, wherein said magnetometer comprises on each axis a single coil having a saturable core controlled in such manner as to furnish a d-c voltage which is proportional to the component of the magnetic field along said axis.

4 Claims, 4 Drawing Figures

STATIC NON-SWINGING COURSE DETERMINING DEVICE ON A VEHICLE

The present invention relates to a static nonswinging course determining device on board a ground, sea, or more particularly, an air vehicle.

Knowledge of the magnetic course is an important factor in the navigation of sea or air craft, since it is required for determining the true course as a function of the value of the local declination.

The human navigator may be content with the reading of the magnetic course on a swinging magnetic compass floating in a damping bath; the declination is then introduced by offsetting the reading zone, but the course read off is then never the real course owing, on one hand, to the slowness of the oscillation due to the damping and, on the other hand, to the fact that the compass is necessarily swinging so that the compass indicates the direction of the earth's magnetic field along an apparent horizontal, the longitudinal accelerations and the centrifugal accelerations in turns considerably modifying the position of the apparent horizontal.

For this reason, the reading of the course on a simple magnetic compass has been abandoned for some time now and a magnetic compass is now mounted on board aircraft only as an auxiliary safety instrument, since its operation depends on no supply which is liable to break down so that it is a self-sufficient independent instrument.

For a precise navigation, there are at present employed gyro-compasses in which a directional gyroscope controlled by the magnetic compass maintains the North reference, but in these apparatus it is necessary to employ a slow control so as not to seriously disturb the directional gyroscope in the course of short-duration changes in the attitude of the aircraft (tucking, diving, turning) so that the indicated course is only exact in a stabilized rectilinear flight.

Nonetheless, in the course of continual evolutions of the carrier vehicle — as is the case of aircraft and helicopters on special missions — the value of the gyrometric course is:

erroneous due to the gimbals of the gyroscope when the frames are no longer orthogonal, disturbed by the phenomena of viscosity of the liquid damping the bar and the action, in turns, of centrifugal forces on the mass compensating the vertical component of the earth's magnetic field (phenomenon termed change of North in the language of navigators).

In the case where the gyromagnetic course is employed as an input parameter of a navigation computer, one of the main functions of which is to integrate, as a function of time, the ground speed, or rather its component along axes with reference to the ground, the course errors have serious consequences on the calculation of the path travelled through. It is consequently important to have course information which is as precise as possible. Gyro-compasses known at the present time also have the following drawbacks:

they are necessarily heavy, since the gyroscope must have a large mass and the frames of the dials an excellent rigidity;

they are expensive since they can only operate if they are of a perfect mechanical construction and have high precision;

they consume an appreciable amount of energy, of the order of a tenth of a watt;

they require a compensation, namely a semi-circular compensation, which is rather delicate to achieve and comprises placing small magnets in the vicinity of the compass at regions which are determined experimentally in the carrier vehicle.

It is not possible, without complicating the compensation, to place two gyro-compasses near each other when, for reasons of safety, the equipment is required to be duplicated which is the case on all modern aircraft.

An object of the present invention is to overcome these drawbacks and to provide a static device for determining the course of a vehicle, which device is non-swinging, that is insensitive to variation in the apparent vertical as a function of changes of attitude of the carrier vehicle and of accelerations, devoid of damping means, that is to say that the exact course is furnished instantaneously, which permits an easy semi-circular compensation, without the juxtaposition, for reasons of safety, of two or more identical devices resulting in any disturbance in the operation of each one of the devices.

The invention therefore provides a device which comprises a magnetometer having three axes for determining the components of the earth's magnetic field along three axes fixed with respect to the vehicle, a vertical gyroscope, and a computer for calculating the direction with respect to the vehicle of the horizontal component of the earth's magnetic field, wherein said magnetometer comprises on each axis a single coil having a saturable core controlled in such manner as to furnish a d-c voltage which is proportional to the components of the magnetic field along said axes.

The features of the device according to the invention will be clear from the ensuing detailed description with reference to the accompanying drawing. As the three elements of the combination: magnetometer, vertical gyroscope and computer, are known as concerns their principle of operation, they will not be described in a detailed manner, merely the particular features necessary for the applications thereof in accordance with the invention will be mentioned.

In the drawings:

FIGS. 1a, 1b, recall the operation of a magnetometer;

Figure 1A:
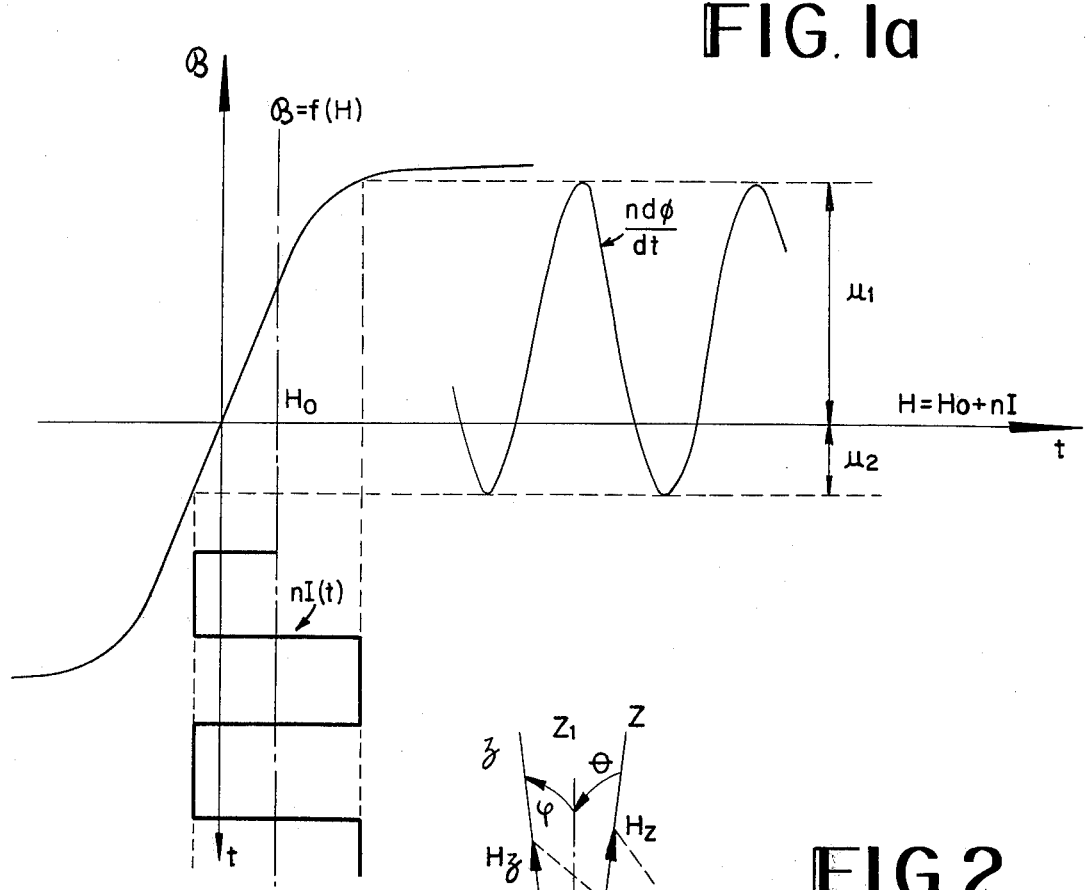

The principle of operation of a magnetometer will first be recalled:

A coil having a saturable magnetic core energized with alternating current has dissymmetry in the peak voltages when the core is subjected to an exterior magnetic field, for example a component $H_o$ of the earth field H. FIG. 1a illustrates this phenomenon. This dissymmetry in the peaks is employed as an error signal for controlling a negative feedback magnetic field $-H_o$ which is proportional to the d-c current in the coil. The measurement of this current gives the value of the component $H_o$ of the earth field H along the axis of the coil, since, at each instant, the control maintains the field seen by the magnetic core null.

Figure 1B:
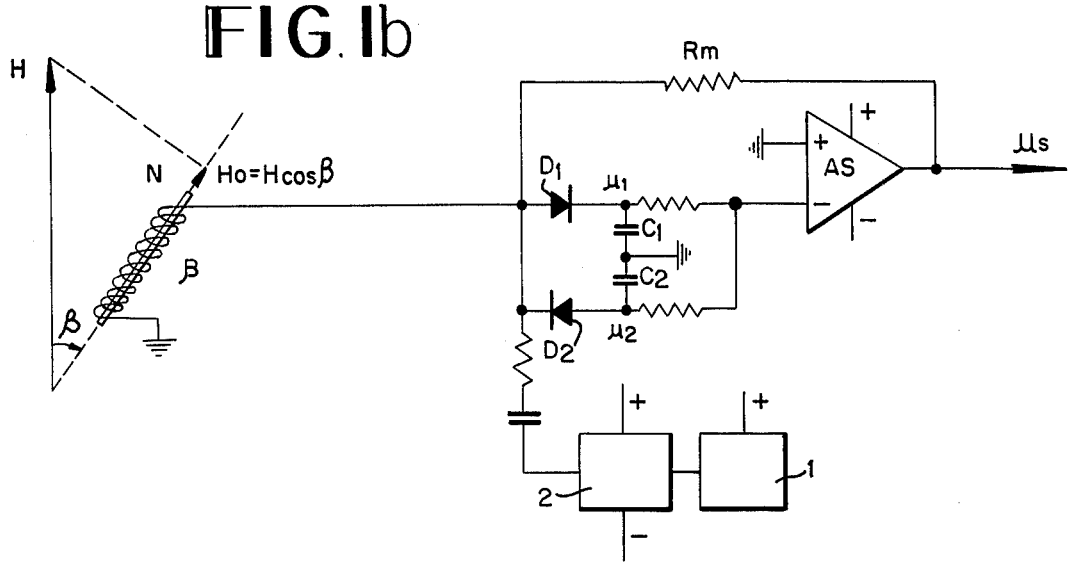

FIG. 1b recalls the diagram of the principle of operation of the magnetometer comprising a core N and a coil B placed on an axis making an angle $\beta$ with an exterior field H.

The core is traversed by a component $H_o = H \cos \beta$ of the field H.

The coil is supplied with high-frequency square signals by an oscillator 1 associated with a frequency divider 2. The peak voltages U1, U2 are transmitted through diodes D1, D2 and capacitors C1, C2 to an adding-amplifier A.S. which imposes in the resistor R$m$ and the coil B the d-c current creating the field $-H_o$ in the core.

The voltage $U_s$ developed by this d-c current at the terminals of the assembly comprising the resistor R$m$, coil B, is therefore proportional to the field $H_o$ and constitutes the measurement of this field.

Magnetometers of this type have a sensitivity which is the higher as the ratio of the length of the bar to its diameter is greater. Existing magnetometers have a relatively large-diameter bar of mumetal or a hollow core constituted by a thin sheet of mumetal rolled in the form of a tube. Owing to the mass of magnetic metal they cannot be supplied at high frequency without having large losses which disturb the measurement and, moreover, they have a large amount of background noise which may be attributed mainly to the following two phenomena:

Barkausen effect which is the greater as the mass of the magnetic core is larger;

Non-uniformity in the alternative field in the whole of the bar, particularly at the ends, which are all the more marked as the ratio between the length and the diameter of the core is smaller; this promotes the preceding effect.

A first improvement according to the invention comprises:
- taking as a core a very thin 0.1 mm mumetal wire having a length of 50 mm which affords a very high ratio length/diameter of 500,
- and introducing the wire on the axis of a ceramic tube having an outside diameter of 0.6 mm on which is wound a solenoid having a wire of 5/100 mm diameter.

The magnetic core is thus perfectly centered on the axis of the coil and this also contributes to a reduction in the background noise.

As concerns its length, the solenoid extends distinctly beyond each end of the core by about 2 mm.

This arrangement has the following advantages:
- high sensitivity,
- possibility of a high frequency supply,
- substantial reduction in background noise,
- low consumption (of the order of 120 milliwatts),
- considerable lightness and small overall size, the latter advantages being of particular interest when the carrier vehicle is an aircraft.

In order to simplify the language in the ensuing description, the carrier vehicle will be termed an aircraft although it must be understood that the invention is also applicable to ships and ground vehicles.

Three magnetometers are disposed on the axes of a tri-rightangled trihedral OXYZ connected to the aircraft. Knowing on one hand, the three components of the earth's magnetic field along the axes and, on the other hand, the data furnished by the vertical gyroscope which exists on all aricrafts, which gives the attitude of the aircraft, permits calculating mathematically the value and direction of the earth's magnetic field and the value and direction of the horizontal component of the earth's magnetic field; this direction of the horizontal component of the earth's magnetic field makes with the axis of the aircrat an angle $\alpha$ which is the magnetic course of the aircraft.

Although, on principle, the trihedral OXYZ may be of any type, there is preferably chosen a trihedral connected to the aircraft which is such that in stablized horizontal rectilinear flight with a medium loading of the aircraft:

the axis OX is the roll axis,
the axis OY is the pitch axis,
the axis OZ is the yaw axis.

The interest of this choice will be seen hereinafter.

Figure 2:
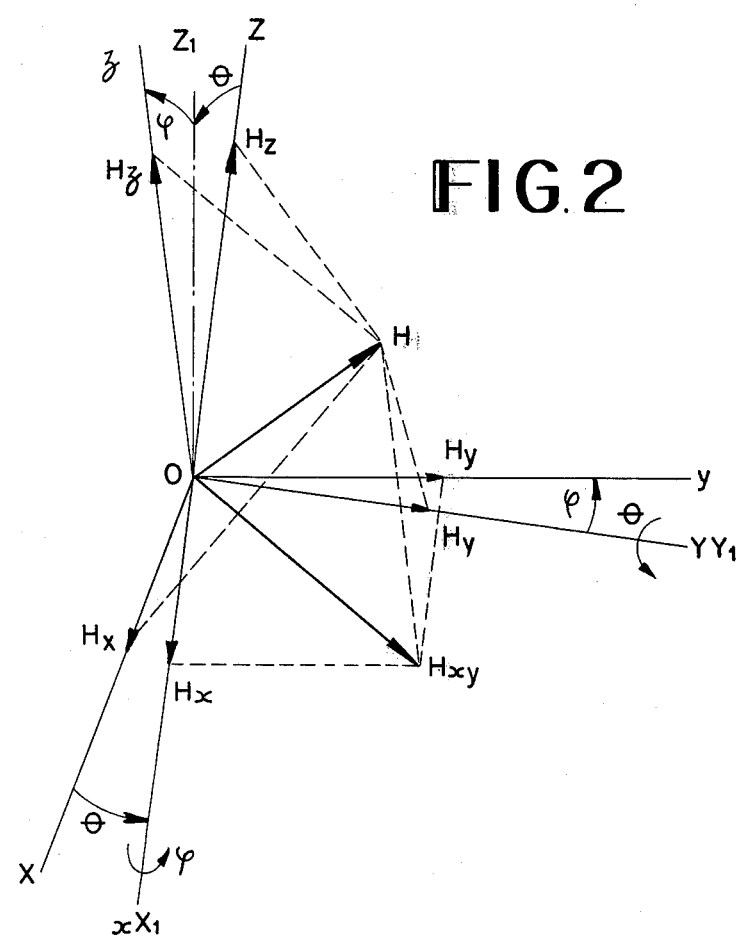
FIG. 2 is a simple geometric figure for establishing the trigonometric formulae for calculating the horizontal component of the earth's magnetic field.

The compass has three fluxgates disposed on the axes of the trihedral OXYZ of the aircraft. HX, HY, HZ are the components of the axes of the earth's magnetic field H (FIG. 2).

If Oxyz is the horizontal aircraft trihedral deduced from the foregoing by a rotation through an angle $\theta$ about OY defining the trihedral OX$_1$Y$_1$Z$_1$ with $\vec{Y} = \vec{Y}_1$, and a rotation through an angle $\phi$ about OX$_1$ defining the trihedral Oxyz with $\vec{x} = \vec{X}_1$. $\phi$ is the instantaneous transverse trim angle, $\theta$ the instantaneous longitudinal trim angle and are measured by the vertical reference.

The flux meters measure HX, HY, HZ. Knowing $\theta$ and $\phi$ permits knowing by calculation H$x$ and H$y$ which are the horizontal components of the earth's field in the longitudinal and transverse directions of the aircraft. Whence the magnetic course $\alpha$ from:

$$\alpha = \arctan \frac{H_y}{H_x} \quad (1)$$

Indeed, the two successive rotations give:
$$\left. \begin{array}{l} HX_1 = HX \cos \theta + HZ \sin \theta \\ HY_1 = HY \\ HZ_1 = HZ \cos \theta - HX \sin \theta \end{array} \right\} \quad (2)$$

and
$$\left. \begin{array}{l} Hx = HX_1 \\ Hy = HY_1 \cos \phi + HZ_1 \sin \phi \\ Hz = HZ_1 \cos \phi - HY_1 \sin \phi \end{array} \right\} \quad (3)$$

whence:
$$\left. \begin{array}{l} Hx = HX \cos \theta + HZ \sin \theta \\ Hy = HX \sin \theta \cdot \sin \phi + HY \cos \phi + HZ \cos \theta \cdot \sin \phi \\ Hz = HX \sin \theta \cdot \cos \phi - HY \sin \phi + HZ \cos \theta \cdot \cos \phi \end{array} \right\} (4)$$

The first two equations of the system of equations (4) permit with the equation (1) calculating the course $\alpha$ whose general expression is:

$$\alpha = \arctan \frac{-HX \sin \theta . \sin \phi + HY \cos \phi + HZ \cos \theta . \sin \phi}{HX \cos \theta + HZ \sin \theta} \quad (5)$$

This equation (5) shows the interest of the choice which was made of the trihedral OXYZ since, in a stabilized horizontal rectilinear flight with a medium load, the angles $\theta$ and $\phi$ are null. The terms in sine are null and the terms in cosine are equal to 1.

The course becomes:

$$\alpha = \arctan \frac{HY}{HX}$$

In the event of break-down of the vertical gyroscope (break-down which may be detected automatically) it is sufficient to continue the calculation of the course with the same equation with angles $\theta$ and $\phi$ null. The course $\alpha$ will still be strictly accurate in stabilized horizontal flight. A small variation in the load modifying the incidence is represented by a value $\theta$ in the neighbourhood of zero; a flight path which deviates but little from the horizontal and from a rectilinear path is manifested by very low values of pitch angle $\theta$ and roll angle $\phi$; the sines remain very close to zero and the cosines very close to 1, the calculated course $\alpha$ is under these conditions acceptable for a safety navigation.

Figure 3:
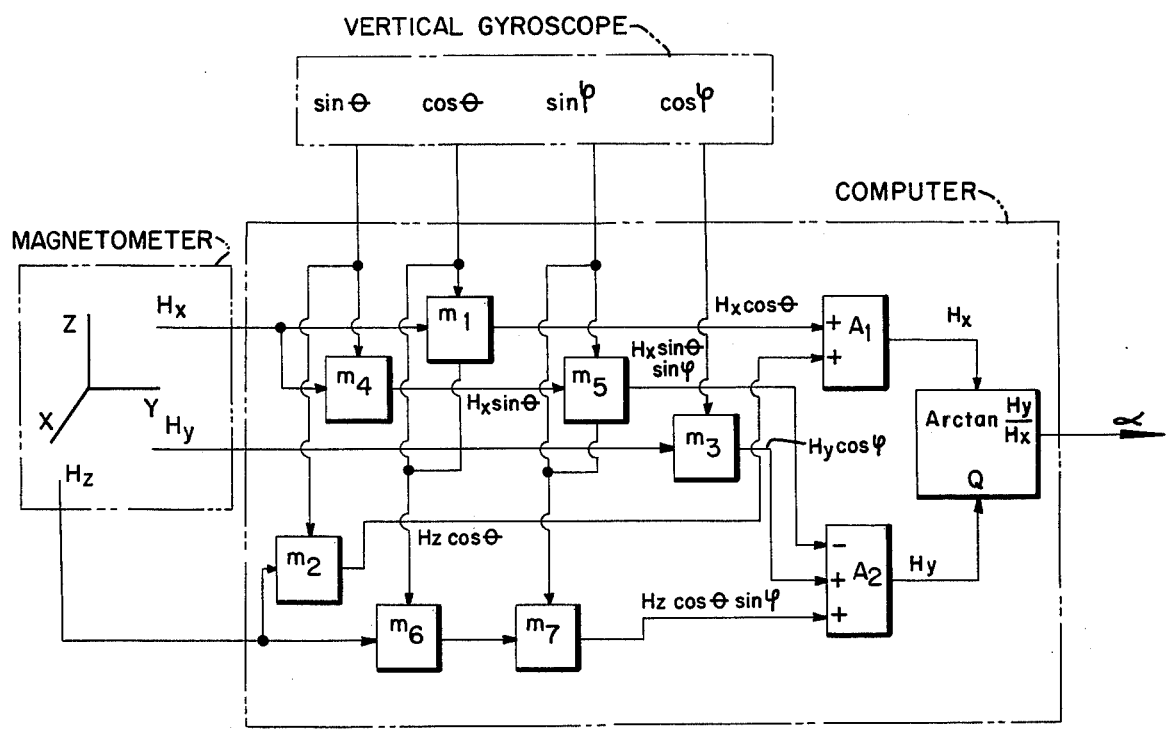
FIG. 3 is a complete diagram of the system.

FIG. 3 shows diagrammatically the assembly of the device with a computer comprising multiplying units $m_1$ to $m_7$ and adding units $A_1$, $A_2$.

In the computer, a unit $m_1$ receives from the gyroscope the value cos $\theta$ and from the magnetometer the value HX for working out the product HX cos $\theta$ which is sent to the adding unit $A_1$.

A unit $m_2$ receives from the gyroscope the value sin $\theta$ and from the magnetometer the value HZ for working out the product HZ sin $\theta$ also sent to the unit $A_1$ which calculates the addition:

HX cos $\theta$ + HZ sin $\theta$ = Hx which is the denominator in the formula (5).

A unit $m_3$ receives from the gyroscope the value cos $\phi$ for calculating the product HY cos $\phi$ which is sent to the adding unit $A_2$.

A unit $m_4$ receives from the gyroscope the value sin $\theta$ and from the magnetometer the value HX for calculating the product HX sin $\theta$ which is sent to the unit $m_5$ which receives from the gyroscope the value sin $\phi$ for calculating the product HX sin $\theta$ · sin $\phi$ which is sent with the minus sign to the adding unit $A_2$.

A unit $m_6$ receives from the magnetometer the value HZ and from the gyroscope the value cos $\theta$ for calculating the product HZ cos $\theta$ which is sent to the unit $m_7$ which receives from the gyroscope the value sin $\phi$ for calculating the product HZ cos $\theta$ · sin $\phi$. This value is received in the adding unit $A_2$ at the output of which is obtained the sum:

HY cos $\phi$ − HX sin $\theta$ $\theta$. sin $\phi$ + HZ cos $\theta$ · sin $\phi$ = HY which is the numerator of the equation (5).

The values Hx and Hy from the units $A_1$ and $A_2$ are received in a unit Q which gives the course:

$$\alpha = \arctan \frac{Hy}{Hx}$$

Several modifications may be adopted for the computer shown in FIG. 3.

1. If there is a central computer on board the aircraft the computer of the device may be an integral part of the central computer.

2. If the navigation computer which must employ the course $\alpha$ is a digital computer, the course computer is an integral part of the navigation computer.

3. If the navigation computer which must employ the course $\alpha$ is an analog computer the course computer may be an analog computer.

The three fluxmeters placed on the axes OX, OY, OZ, are without influence on each other and may be placed in a common small case. Indeed, as has been explained hereinbefore, in operation, the field in each bar is null, and everything happens as if the core was of a non magnetic metal. As a result of this feature, two identical magnetometers may be placed near to each other without interaction and with no adverse effect on the semi-circular and inclination compensation.

The device is also advantageous in that it permits effecting at a distance the parasitic semi-circular and inclination compensation without requiring access to the apparatus; indeed in order to compensate the effect of the permanent magnets present in the aircraft, it is sufficient to send to each coil of the magnetometer d-c currents which are metered so that the resultant field thus created is equal and opposite to the field created by these permanent parasitic magnets.

Accessorily, it is clear that knowing the three components of the earth's field given by the magnetometer and of the trim of the aircraft given by the vertical gyroscope, permits adapting the computer to calculate and to ascertain at each point of the globe at which the aircraft is located the intensity and inclination to the horizontal of the earth's magnetic field.

The device according to the invention leads itself particularly well to the construction of navigation equipment on board earth, sea and, more particularly, aircraft having a computer on board.

What I claim is:

1. In a static non-swinging device for determining on board the course of a vehicle, comprising a magnetometer with three axes for determining the components of the earth's magnetic field along three axes fixed with respect to the vehicle, a vertical gyroscope for determining the attitude of the vehicle, and a computer for calculating the direction with respect to the vehicle of the horizontal component of the earth's magnetic field from signals produced by the magnetometer and the gyroscope, the improvement wherein the magnetometer comprises on each said axis of said magnetometer a single coil having a saturable core and further comprising means for supplying high frequency squarewave signals to each said coil, a plurality of adder amplifiers, each being associated with one of said coils, a plurality of coupling circuits, each connecting one end of one of said coils with an input of one of said amplifiers, each said circuit having a branch connected between said one end and said input, said branch having a diode their having one end thereof connected to said one end of said coil and a capacitor connected between the other end of said diode and common potential, said branch coupling peak signals due to the component of the earth's magnetic field from said coil along each said axis to said input of said adder-amplifier, and a supply resistor for said coil connected between the output terminal of said adder-amplifier and said one end of said coil wherein the output signal of said adder-amplifier is applied to said supply resistor.

2. The apparatus of claim 1 wherein said circuit has two branches for transmitting peak signals of opposite polarity from said one end of said one of said coils to said input of said adder-amplifier, each branch having a diode, one end of which is coupled to one end of said coil, the other end of each said diode being coupled to a common point through a capacitor.

3. A device as claimed in claim 1, wherein the core of each coil is made of fine wire whose length diameter ratio is about 500, said wire being located on the axis of a small ceramic tube on which is wound a solenoid which extends beyond each end of said core.

4. A device as claimed in claim 1, wherein each coil is supplied with a continuous voltage which is characterisitic of the opposite of the component of the parasitic field along the axis of said coil.

* * * * *

UNITED STATES PATENT OFFICE
CERTIFICATE OF CORRECTION

PATENT NO. : 3,936,949
DATED : February 10, 1976
INVENTOR(S) : Jacques Devaud

It is certified that error appears in the above—identified patent and that said Letters Patent are hereby corrected as shown below:

Item [73] Assignee should read as follows:

Crouzet, Paris, France

Signed and Sealed this twenty-second Day of June 1976

[SEAL]

Attest:

RUTH C. MASON
Attesting Officer

C. MARSHALL DANN
Commissioner of Patents and Trademarks